(12) United States Patent
Dufour et al.

(10) Patent No.: US 12,123,552 B2
(45) Date of Patent: Oct. 22, 2024

(54) ENERGY-OPTIMIZED BACKFEEDING INSTALLATION

(71) Applicant: GRTGAZ, Bois Colombes (FR)

(72) Inventors: Daniel Dufour, Bois Colombes (FR); Alban Sesmat, Bois Colombes (FR); Francis Francis, Bois Colombes (FR)

(*) Notice: Subject to any disclaimer, the term of this patent is extended or adjusted under 35 U.S.C. 154(b) by 909 days.

(21) Appl. No.: 17/252,075

(22) PCT Filed: Jun. 17, 2019

(86) PCT No.: PCT/FR2019/051473
§ 371 (c)(1),
(2) Date: Dec. 14, 2020

(87) PCT Pub. No.: WO2019/239083
PCT Pub. Date: Dec. 19, 2019

(65) Prior Publication Data
US 2021/0254790 A1 Aug. 19, 2021

(30) Foreign Application Priority Data
Jun. 15, 2018 (FR) ...................................... 1855299

(51) Int. Cl.
*F17D 1/07* (2006.01)
*F17D 1/04* (2006.01)

(52) U.S. Cl.
CPC ........ *F17D 1/07* (2013.01); *F17D 1/04* (2013.01)

(58) Field of Classification Search
CPC ..... F17D 1/04; F17D 1/07; F17D 3/01; F17D 3/10; Y10T 137/0324; Y10T 137/0396;
(Continued)

(56) References Cited

U.S. PATENT DOCUMENTS

| 3,844,306 A | * | 10/1974 | Hill | ........................... F17D 1/04 137/256 |
| 4,849,648 A | * | 7/1989 | Longardner | .......... H02J 15/006 290/43 |
| 4,858,640 A | * | 8/1989 | Kaufmann | ................ F17D 1/04 137/236.1 |

(Continued)

FOREIGN PATENT DOCUMENTS

| DE | 102008058736 B3 * | 8/2010 | ............... F17D 1/04 |
| DE | 102009038128 A1 | 2/2011 | |

(Continued)

OTHER PUBLICATIONS

Machine Translation of DE102009038128 retrieved from espacenet. com Sep. 27, 2023. (Year: 2023).*

(Continued)

*Primary Examiner* — Jessica Cahill
(74) *Attorney, Agent, or Firm* — Patshegen IP; Moshe Pinchas (57) ABSTRACT

The invention relates to an energy-optimized backfeeding installation (30), comprising:
  at least one compressor (21) between a gas network (15) at a first pressure and a gas network (10) at a second pressure higher than the first pressure, said compressor being driven by an electric motor,
  an automaton (25) for controlling the operation of each compressor,
  at least one sensor (19) for quality compliance of the gas circulating in the compressor,
  at least one meter (20) for metering a flow rate of gas circulating in the compressor,
  at least one filter (22) for filtering the gas circulating in the compressor,
  a gas expander for expanding gas initially at the second pressure in order to supply the gas network at the first pressure, and
  a generator driven by the gas expander.

18 Claims, 8 Drawing Sheets

(58) Field of Classification Search
CPC ......... Y10T 137/86035; Y10T 137/402; Y02E 20/14
See application file for complete search history.

(56) References Cited

U.S. PATENT DOCUMENTS

| | | |
|---|---|---|
| 7,624,770 B2 | 12/2009 | Boyd et al. |
| 11,719,389 B2 * | 8/2023 | Dufour .................... F17D 1/04 137/2 |
| 2007/0163256 A1 * | 7/2007 | McDonald ................ F17D 1/04 60/597 |
| 2013/0180241 A1 * | 7/2013 | Middelmann ........... F02B 41/10 60/604 |
| 2015/0240996 A1 * | 8/2015 | Kapoor ................. F17C 13/002 137/565.17 |

FOREIGN PATENT DOCUMENTS

| | | |
|---|---|---|
| FR | 3001523 A1 | 8/2014 |
| FR | 3007417 A1 | 12/2014 |
| FR | 3035598 A1 | 11/2016 |
| WO | WO8702758 A1 * | 5/1987 |

OTHER PUBLICATIONS

SR; European Patent Office; Netherlands; Nov. 5, 2019.
Phil Winnard; "IFI Capacity Enhancement Project MP To IP Network Compression" Oct. 17, 2012.
Jens Darochat et al; The Power Pioneers Bio-Natural Gas Plant Emmertsbuhl Feeding Biogas Into the Natural Grid Emmertsbuhl; Apr. 4, 2012.

* cited by examiner

ENERGY-OPTIMIZED BACKFEEDING INSTALLATION

TECHNICAL FIELD

The present invention relates to an energy-optimized backfeeding installation. It applies, in particular, to gas transport networks for exporting oversupplies of renewable natural gas from a distribution network to a transport network, which has a much larger storage capacity.

STATE OF THE ART

Biogas production is growing rapidly in Europe. The added value it brings underpins the creation of a sustainable anaerobic digestion industry. Hereinafter, the term "biomethane" means the gas produced from the raw biogas obtained from the anaerobic digestion of organic waste (biomass) or by high-temperature gasification (followed by methanation synthesis), which is then cleaned and treated so that it becomes interchangeable with the natural gas of the network.

While the most common method of adding value is the generation of heat and/or electricity, its utilization as a fuel and the injection of biomethane into the natural gas network are also being developed.

Against a background of the rapid development of biomethane, the natural gas distributors are faced with situations in which there is a shortage of outlets. This is because consumption by domestic customers over the public distribution systems varies on average from 1 to 10 between winter and summer. The injection of biomethane is initially possible only if it is done at a flow rate less than the minimum flow rate recorded during the periods of lowest consumption, or if the biomethane is produced as close as possible to where it is consumed. When production exceeds the quantities consumed, this tends to saturate the distribution networks during warm seasons. This situation limits the development of the biomethane production industry through the congestion of the natural gas distribution networks. Several solutions have been identified to solve this problem: the interconnection of distribution networks to increase the consumption capacities for the biomethane produced by increasing the number of consumers connected; adjusting biomethane production according to the seasons and consumption needs; micro-liquefaction and compression for storing biomethane production during periods of low consumption; the development of uses for the gas (in particular, for mobility); and the production of backfeeding units between the natural gas distribution and transport networks.

Backfeeding installations are therefore one of the solutions identified for developing biomethane injection capacities. These installations make it possible to export oversupplies of biomethane from a distribution network to the transport network, by compressing and reinjecting them into this transport network to benefit from its much larger gas storage capacity. Consequently, the producers would no longer have to limit their production and the profitability of their projects would be guaranteed more easily. The backfeeding unit is a structure of the transport operator that allows gas to be transferred from the distribution network to the transport network having a larger storage capacity, via a gas compression station. The backfeeding unit can be located either in the vicinity of the pressure reducing station or at another location where the transport and distribution networks cross.

The existing backfeeding units have the disadvantage of high capital and operating costs, especially in terms of electrical consumption.

DESCRIPTION OF THE INVENTION

The present invention aims to remedy all or part of these drawbacks.

The present invention relates to an energy-optimized backfeeding installation comprising:
- at least one compressor between a gas network at a first pressure and a gas network at a second pressure higher than the first pressure, said compressor being driven by an electric motor;
- an automaton for controlling the operation of each compressor;
- at least one sensor for checking the quality compliance of the gas circulating in the compressor;
- at least one meter for metering a flow rate of gas circulating in the compressor;
- at least one filter for filtering the gas circulating in the compressor;
- a gas expander for expanding gas initially at the second pressure in order to supply the gas network at the first pressure; and
- a generator driven by the gas expander.

Thanks to these provisions, the expansion of the high-pressure gas from a transport network to the low or medium pressure of a distribution network generates electricity which can then be used to drive the electric motor of the compressor.

In this way, the present invention optimizes the energy consumption of a backfeeding installation associated with a gas delivery station. It uses expansion energy of the gas delivery station and minimizes the operating cost of the backfeeding installation linked to the compression energy consumption.

In some embodiments, the compressor and the gas expander are one and the same.

Thanks to these provisions, the manufacturing cost of the backfeeding installation is reduced.

In some embodiments, the generator is formed by the electric motor of at least one compressor.

Thanks to these provisions, the manufacturing cost of the backfeeding installation is reduced.

In some embodiments, the backfeeding installation comprises a clutch between the gas expander and the generator.

Thanks to these provisions, if the generator is formed by the electric motor of a compressor, the operation of the compressor does not drive the gas expander.

In some embodiments, the backfeeding installation comprises a clutch between the compressor motor and the compressor.

Thanks to these provisions, if the generator is formed by the electric motor of a compressor, the operation of the gas expander does not drive the compressor.

In some embodiments, the backfeeding installation comprises a means for venting the gas expander.

Thanks to these provisions, if the generator is formed by the electric motor of a compressor, the operation of the compressor uses very little power at the level of the gas expander because the gas expander is then vented.

In some embodiments, the backfeeding installation comprises a means for venting the compressor.

Thanks to these provisions, if the generator is formed by the electric motor of a compressor, the operation of the gas expander is little affected by the operation of the compressor which is then vented.

In some embodiments, the backfeeding installation also comprises a gas expander with no energy recovery in parallel with the gas expander driving the generator. In these embodiments, an existing delivery station with an expansion valve is modified and a parallel circuit is added to it to let gas pass through a gas expander driving the generator. These embodiments allow two gas circuits to coexist, with the possibility of using the expansion station in conventional mode or as an electricity generator.

In some embodiments, the compressor is a compressor with a piston and flap valves.

In some embodiments, the compressor is a centrifugal compressor with variable blades.

Thanks to each of these provisions, the compressor is reversible into a drive expander for the generator.

In some embodiments, the backfeeding installation comprises a shared reversible heat exchanger for heating the gas to be expanded and cooling the gas to be compressed.

In some embodiments, the backfeeding installation comprises, during the operation of the expander, cold and electrical power cogeneration.

In some embodiments, the backfeeding installation comprises, during the operation of the compressor, heat generation.

In some embodiments, the backfeeding installation is associated with a heat and electrical power cogeneration unit, the heat being used to heat the gas during expansion, the electricity outlet 302 of the generator being linked to the electricity outlet 303 of the cogeneration unit.

In some embodiments, the cogeneration unit comprises a motor coupled to a generator, the heat generated by the motor heating the gas during expansion.

In some embodiments, the thermal energy from the motor is contained in the motor's cooling waters (lubrication oil, piston liners, cooling of the gas) and in the smoke released by the combustion, a heat-transfer circuit collecting at least a portion of this thermal energy to preheat the gas before expansion, and possibly reheat it during the expansion, in the case of a stepped expansion.

In some embodiments, the cogeneration unit comprises a geothermal source whose residual heat, after heating buildings or equipment, reheats the gas during expansion.

In some embodiments, the backfeeding installation comprises a heat pump.

In some embodiments, the generator comprises an alternator, a 4-pole synchronous generator that runs at the speed of the network, for example 50 Hz, i.e. 1500 RPM.

In some embodiments, the generator is a reversible radial turbine as a two-stage centrifugal compressor with two rotors mounted either side of an alternator.

In some embodiments, the alternator is variable-speed and comprises a variable stator.

In some embodiments, the expansion or compression are stepped by mounting two rotors on a single shaft.

In some embodiments, the generator comprises a radial turbine mounted on a gearbox with pooling for the lubrication of the roller bearings and gearbox.

In some embodiments, a sealing gasket (oil or gas) isolates the network gas from the environment.

BRIEF DESCRIPTION OF THE FIGURES

Other advantages, aims and characteristics of the present invention will become apparent from the description that will follow, made, as an example that is in no way limiting, with reference to the drawings included in an appendix, wherein.

DESCRIPTION OF EMBODIMENTS OF THE INVENTION

Figure 1:
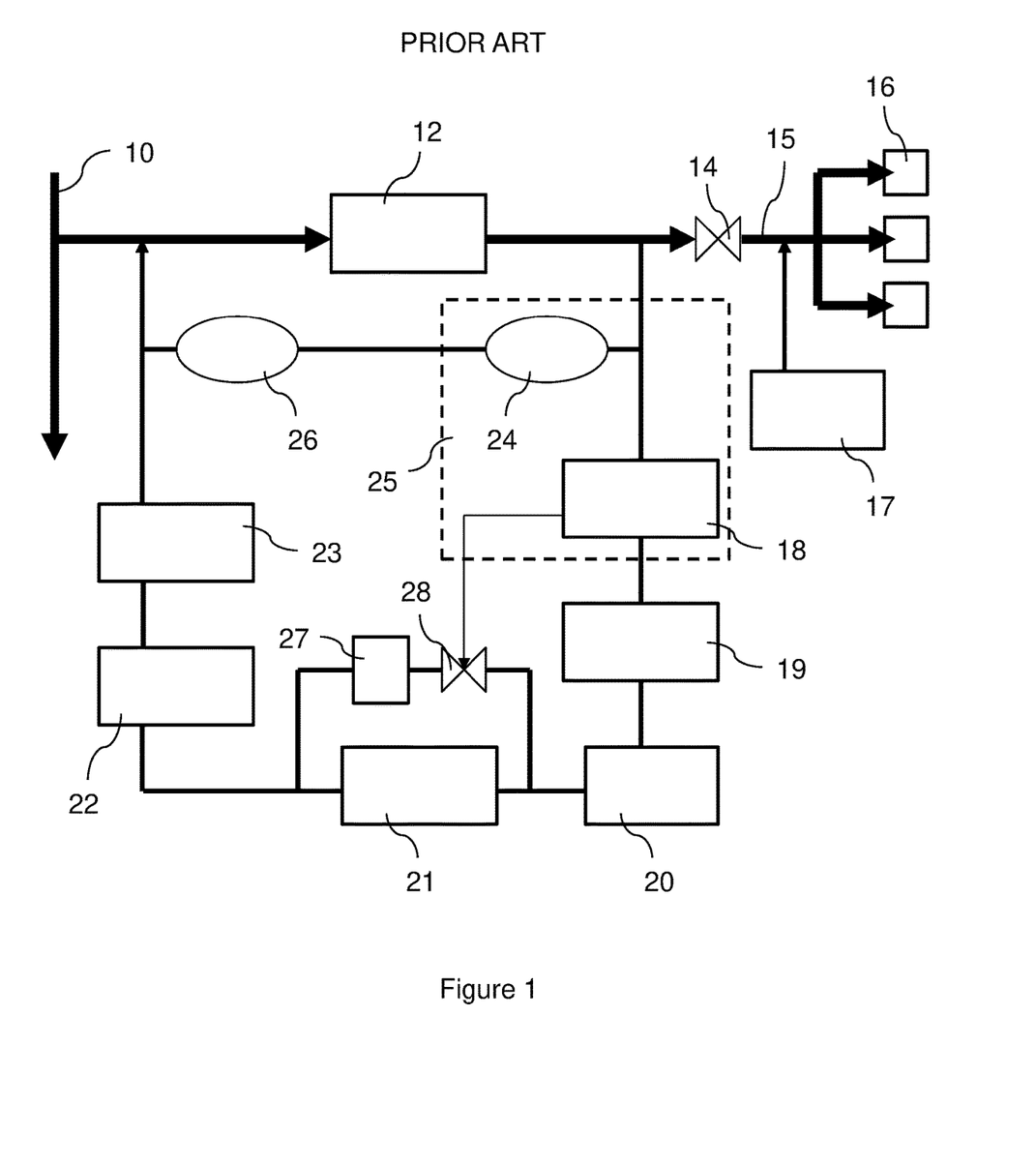
FIG. 1 represents, in the form of a block diagram, a backfeeding installation known in the prior art.

FIG. 1 represents, schematically, the principle of a backfeeding installation known in the prior art. The backfeeding installation has a set of technical functions making it possible to create a flow of gas by controlling the operating conditions specific to a transport network 10 and a distribution network 15. These functions comprise:

processing and verifying 19 the quality compliance of the gas with the technical specifications of the transport operator comprising at least one component sensor for the gas circulating;

metering by meter 20 of the quantities transferred;

compressing the gas from the distribution network 15, by at least one compressor 21, this consists generally of electrically-driven or piston compressors, with two or three compression stages;

regulating 24 the pressure or flow rate;

filtering by filter 22, upstream and downstream;

managing 18 the stability of the operation of the distribution network;

the safety devices 26; and the tools 24 for managing and monitoring the backfeeding installation.

These various functions are described below. In addition, there are the utilities (electrical sources, communication network, etc.) necessary to operate an industrial facility. The backfeeding installation is sized taking into account:

the operating pressure of the transport network 10 and of the distribution network 15. The first must be between 30 and 60 bar over the regional network, and can reach 85 bar over the main network. The second is 4 to 19 bar over the MPC networks (Medium Pressure Network type C, i.e. pressure between 4 and 25 bar) and less than 4 bar over the MPB networks (Medium Pressure Network type B, i.e. pressure between 50 millibar and 4 bar);

the maximum production capacity of the biomethane producers 17 likely to inject biomethane into the distribution network 15, a capacity that varies by several tens of $Nm^3/h$ for the smallest units, to several hundreds of $Nm^3/h$ for the largest;

the consumption of consumers 16 over the distribution network 15, especially the minimum consumption; and the ability of the distribution network 15 to absorb variations in pressure (water volume).

All of this data makes it possible to determine the maximum flow rate of the backfeeding installation and to estimate its operating time. This can vary, depending on the case, from an occasional operation (10-15% of the time) to an almost-permanent operation. This exercise must also include the fact that the installations of the producers 17 are put into service over the years, not simultaneously.

With regard to the analysis 19 of the gas conformity, differences exist between the gas quality specifications applied to the transport 10 and distribution 15 networks, because of the different operating pressures, infrastructure, materials, uses and interfaces with the underground storage sites. The specifications of the transport networks 10 are generally more stringent than those of the distribution networks 10. Therefore, to ensure that the gas backfeeding installation from the distribution network 15 to the transport network 10 is consistent with in-production operations in the transport network 10, the following provisions are included in the gas quality compliance function 19:

a dehydration unit upstream of the compression to reduce the risks of condensation on the high-pressure transport network, the formation of hydrates and corrosion, optionally, a laboratory for analyzing combustion parameters (Wobbe index, heating value and density of the gas), for injecting the samples in the energy determination system of the transport operator.

At the transport operator's discretion, the analysis of other levels of compounds ($CO_2$, $H_2O$, THT, etc.) is optional, and is only carried out if there is a proven risk of contamination of the transport network 10 (for example, backfeeding biomethane with a high $CO_2$ content with no possibility of dilution over the distribution 15 and transport 10 networks, or operation at a very high pressure).

For the gas metering 20, the backfeeding installation is equipped with a measurement chain made up of a meter and a local or regional device for determining the energy per the legal metrology.

With regard to the gas compression, the compression unit enables the surplus biomethane production to be compressed to the operating pressure of the transport network 10. There are several possible configurations, depending on the economic criteria and availabilities of the installation such as, for example:

one compressor 21 providing 100% of the maximum backfeeding need;

two compressors 21, each providing 100% of the maximum backfeeding need; or two compressors 21, each providing 50% of the maximum backfeeding need.

The configuration is chosen by examining the various advantages and drawbacks in terms of costs, availability, dimensions, and scalability of the compression unit. The suction pressure to be considered is the operating pressure of the distribution network 15, which depends in particular on the injection pressures of the biomethane producers 17. The discharge construction pressure to be considered is the maximum operating pressure ("MOP") of the transport network, for example 67.7 bar. To perform the starting phase, the anti-surge protection system of each compressor 21 (other than piston compressors) or the stabilized operation in recycling mode, a recycling circuit 27 equipped with a valve 28 can be provided. The recycling circuit expands the gas to the second pressure and injects it upstream from the compressor when at least one compressor is put into operation, under the control of the automaton 25.

The impermeability of each compressor 21 can be achieved with oil or a dry seal. In the first case, certain filtering provisions are implemented (see below).

An automaton 25 performs the functions of management 24, control of each compressor, and regulation and stability 18 of the network 15. Note that, throughout the description, the term "automaton" means a PLC or computer system, or a set of PLCs and/or computer systems (for example one PLC per function).

With regard to regulation, the change in the pressure of the distribution network 15 in the vicinity of the backfeeding installation is correlated to the flow rate of the gas passing through the backfeeding installation. These changes are the result of the dynamic nature of gas consumption over the distribution network 15, capacities of biomethane injected by the producers 17 and the operation of the delivery installation, by means of a valve 14, and backfeeding installation. This therefore incorporates possibilities to adapt the operating range for the suction pressure of the backfeeding installation, and also a regulation of the compressors 21 that can anticipate the constraints operating over the distribution network 15, depending on the configurations encountered. This differs from delivery stations without backfeed, for which the pressure is regulated at the delivery point so as to be fixed, regardless of the consumption by the consumers 16. Consequently, the regulation mode (pressure or flow rate) of the backfeed flow towards the transport network 10 is adapted to the correct operation of the backfeeding installation.

Depending on the specifications of the compressors, and to prevent their deterioration or because of the constraints linked to the operation of the transport network 10, filtering is envisaged in the gas quality compliance function, upstream from the compression, to collect any liquid and the dust contained in the gas from the distribution network 15. In addition, in the case of an oil-sealed compressor 21, a coalescing filter 22 is installed at the outlet from the compressor 21, for example with manual venting and a gauge glass.

A cooling system 23 cools all or part of the compressed gas to maintain the temperature downstream, towards the transport network 10, at a value below 55° C. (certification temperature of the equipment). To ensure the operation of the cooling system 23, it is sized using relevant ambient temperature values based on meteorological records.

The delivery station 12 is an installation, located at the downstream end of the transport network, which enables the natural gas to be delivered according to the needs expressed by the customer (pressure, flow rate, temperature, etc.). Therefore, this concerns the expansion interface for the gas from the transport network 10 to the distribution network 15 or to certain industrial installations. The delivery station 12 therefore incorporates expansion valves to reduce the pressure in order to adapt to the conditions imposed downstream.

To prevent instability phenomena, the backfeeding installation must not operate simultaneously with the expansion and delivery station 12 from the transport network 10 to the distribution network 15. Threshold values for starting and stopping the backfeeding installation are set accordingly, and each automaton 25 of an installation combining expansion 12 and backfeed is adapted to prohibit the simultaneous occurrence of these two functions. The backfeeding installations, during their starting, operation and stopping phases, limit the disruptions in the upstream network (distribution 15) and downstream network (transport 10) by, in particular, preventing the pressure safety measures of the delivery station 12 from being triggered. The following parameters are taken into account:

number of starting and stopping cycles of each compressor 21 and its compatibility with the recommendations of the supplier of the compressor 21;

the starting and stopping of each compressor 21 by a routine, following a time delay;

the use of a buffer volume (not shown) upstream from each compressor 21, to level out pressure and flow rate variations of the distribution network 15.

A management and monitoring function performed by the automaton 25 makes it possible to obtain:

an automatic operation mode;

display/monitoring of the operation of the backfeeding installation; and the starting of the backfeeding installation.

Data historization is carried out to confirm the operating conditions.

In an emergency, the backfeeding installation is isolated from the distribution network 15 by closing the valve 14. An "emergency stop" function allows the backfeeding installation to be stopped and made safe. The backfeeding installation is also equipped with pressure and temperature safety devices 26. There is no automatic venting unless contraindicated in the safety studies. The backfeeding installation is equipped with gas and fire detection systems 26. A means for protection against excess flows is provided to protect the devices, in the form of a physical component such as a restrictor hole or by means of an automaton.

Note that the flow rate of a backfeeding unit can vary from several hundred to several thousand $Nm^3/h$, depending on the case.

Figure 2:
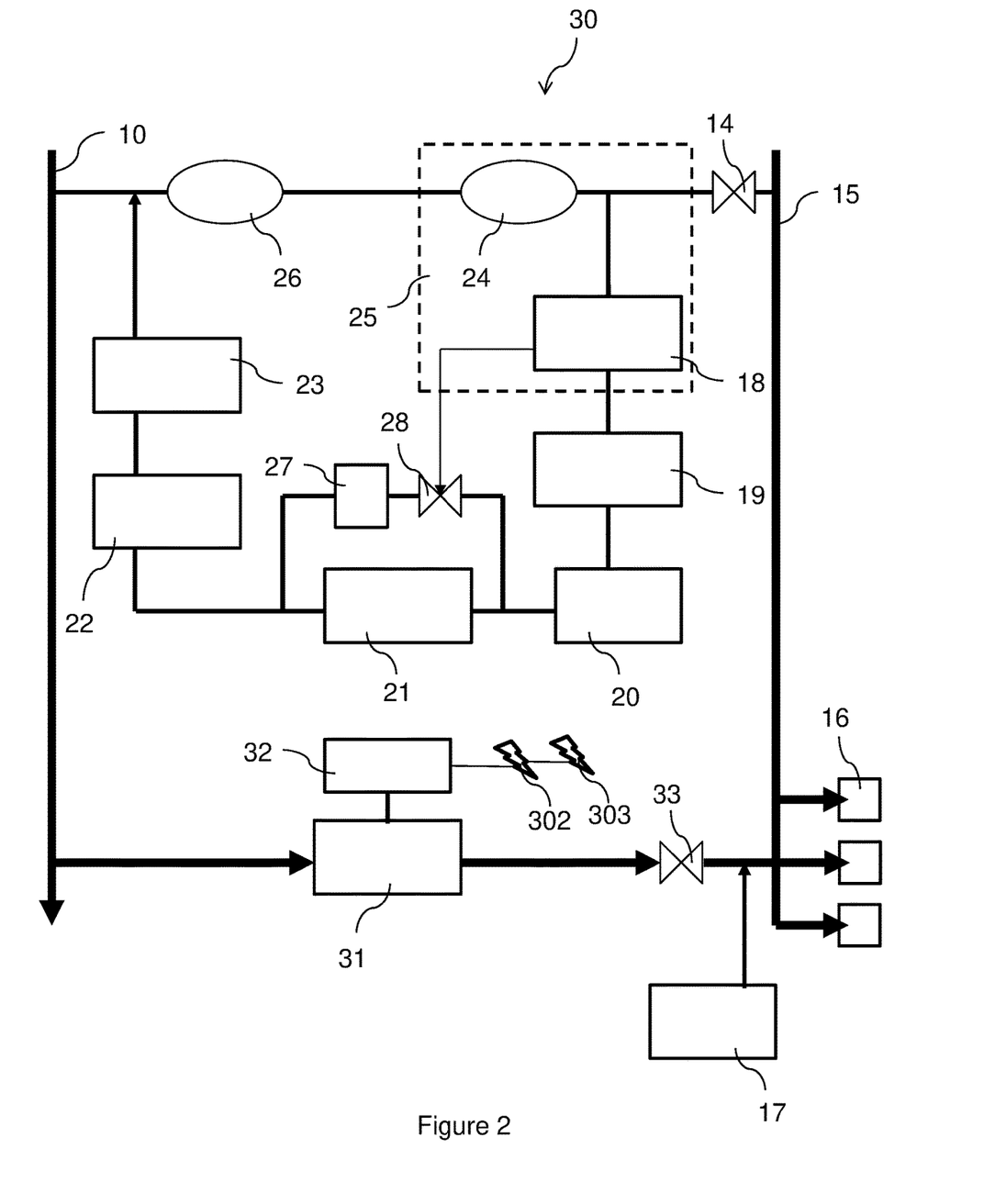
FIG. 2 represents, in the form of a block diagram, a backfeeding installation that is the subject of the invention.

FIG. 2 shows a backfeeding installation 30 according to the invention. This backfeeding installation 30 comprises the same elements as the installation shown in FIG. 1, with the exception of the supply station 12. In contrast, the installation 30 comprises a gas expander 31 for expanding the gas from the transport network 10 to supply the distribution network 15. The gas expander 31 is equipped with an electricity generator 32 driven by the gas expander 31. A valve 33 allows the transport 10 and distribution 15 networks to be isolated.

The present invention seeks to optimize the energy consumption of a gas delivery station and a backfeeding installation. In particular it seeks to use the expansion energy of the gas delivery stations and to minimize the operating cost of backfeeding installations (operating expenses, in particular linked to compression).

The present invention is applicable especially when the backfeeding installation is located close to the delivery station, which is common because this is a clear interface between the transport and distribution networks.

The invention proposes combining the energy potentially available for expansion (delivery station) and the energy required for compression (backfeeding installation).

The optimization of energy between the backfeeding installation and the delivery station is twofold: its aim is both to recover the recoverable energy released during the expansion of gas in the delivery station and also, for some configurations, to share components between the delivery station and the backfeeding installation. As a result, the capital expenditure and operating costs of these installations are reduced.

Figure 3:
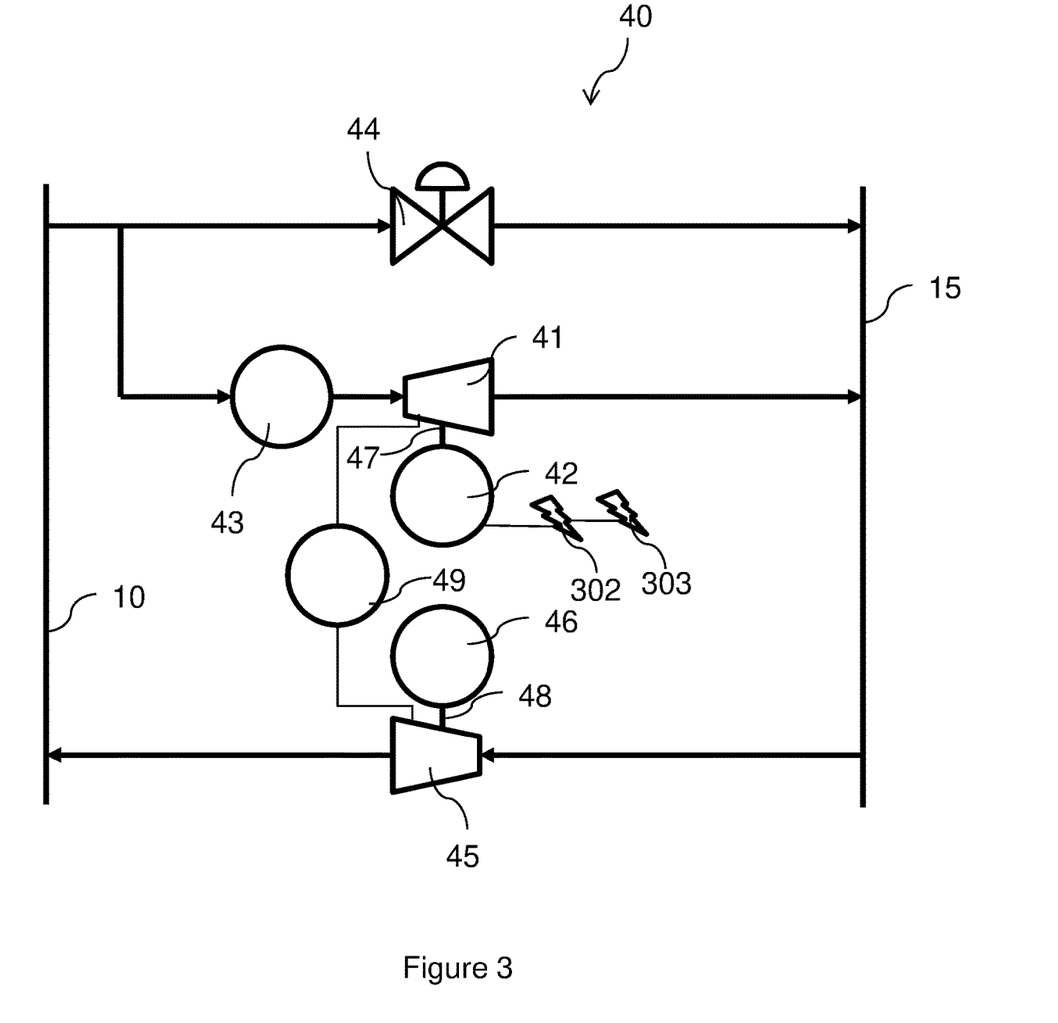
FIG. 3 represents, in the form of a block diagram, a first particular embodiment of a backfeeding installation that is the subject of the invention.
Figure 4:
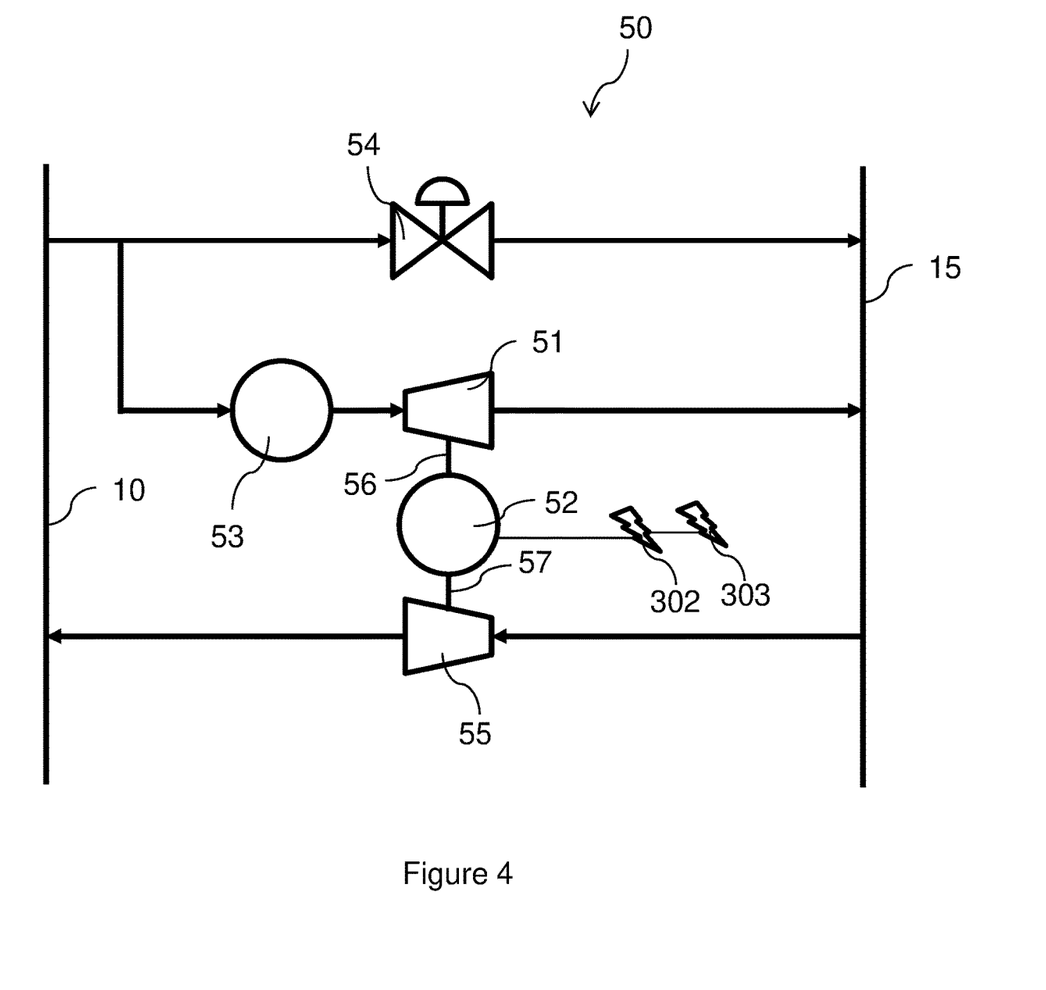
FIG. 4 represents, in the form of a block diagram, a second particular embodiment of a backfeeding installation that is the subject of the invention.

Three configurations are envisaged:

configuration 1, FIG. 3: a gas expander is positioned in parallel to the delivery station in order to recover the expansion energy by means of a generator that produces electrical power. This production of electricity is separate from the backfeeding installation and can be remote from it;

configuration 2, FIG. 4: the motor of the backfeeding installation compressor is used as an alternator or generator. In this way, the energy recovered through the alternator during expansion is used to drive the compressor of the backfeeding unit, which therefore produces electrical power; and configuration 3, FIG. 5: a reversible tool is utilized in one direction to perform the compression required by the backfeeding installation, and in the other direction to perform the expansion required by the delivery station. This provides a reversible expansion and backfeeding unit.

In each of the three configurations, for compressing the gas during the operation of the backfeeding unit the energy optimization uses the expansion energy recovered during the expansion and delivery of the gas to the distribution network.

FIG. 3 shows a portion of a backfeeding installation 40 that is the subject of the invention, in the first configuration mentioned above. This backfeeding installation 40 comprises:

a gas expander 41 expanding gas from the transport network 10 and supplying the expanded gas to the distribution network 15, mechanically driving a generator 42;

a means 43 for heating the gas from the transport network 10, upstream from the gas expander 41;

an expansion valve 44 linked to the transport 10 and distribution 15 networks; and a compressor 45 for compressing the gas from the distribution network 15 and injecting it into the transport network 10, driven by an electric motor 46.

As is easily understood, when the transport network 10 supplies gas to the distribution network 15, the activation of the gas expander 41 results in electricity being generated by the generator 42. In contrast, when the backfeeding compressor 45 is in operation, electricity is consumed by the motor 46 that drives the compressor 45.

FIG. 4 shows a portion of a backfeeding installation 50 that is the subject of the invention, in the second configuration mentioned above. This backfeeding installation 50 comprises:

a gas expander 51 expanding gas from the transport network 10 and supplying the expanded gas to the distribution network 15, mechanically driving a reversible generator 52;

a means 53 for heating the gas from the transport network 10, upstream from the gas expander 51;

an expansion valve 54 linked to the transport 10 and distribution 15 networks; and a compressor 55 for compressing the gas from the distribution network 15 and injecting it into the transport network 10, driven by the reversible generator 52.

As is easily understood, when the transport network 10 supplies gas to the distribution network 15, the activation of the gas expander 51 results in electricity being generated by the generator 52. In contrast, when the backfeeding compressor 55 is in operation, electricity is consumed by the generator 52 thus acting as drive motor for the compressor 55.

In this second embodiment, the generator 52 is formed by the electric motor of at least one compressor 55. As a result, the manufacturing cost of the backfeeding installation is reduced.

Preferably, the backfeeding installation comprises a clutch, 47, 56, 65, between the gas expander and the generator and/or a vent 49, for venting the gas expander.

As a result, the operation of the compressor does not drive the gas expander.

Preferably, the backfeeding installation comprises a clutch, 48, 57, 65 between the compressor motor and the compressor.

As a result, the operation of the gas expander is little affected by the operation of the compressor which is then vented.

Figure 5:
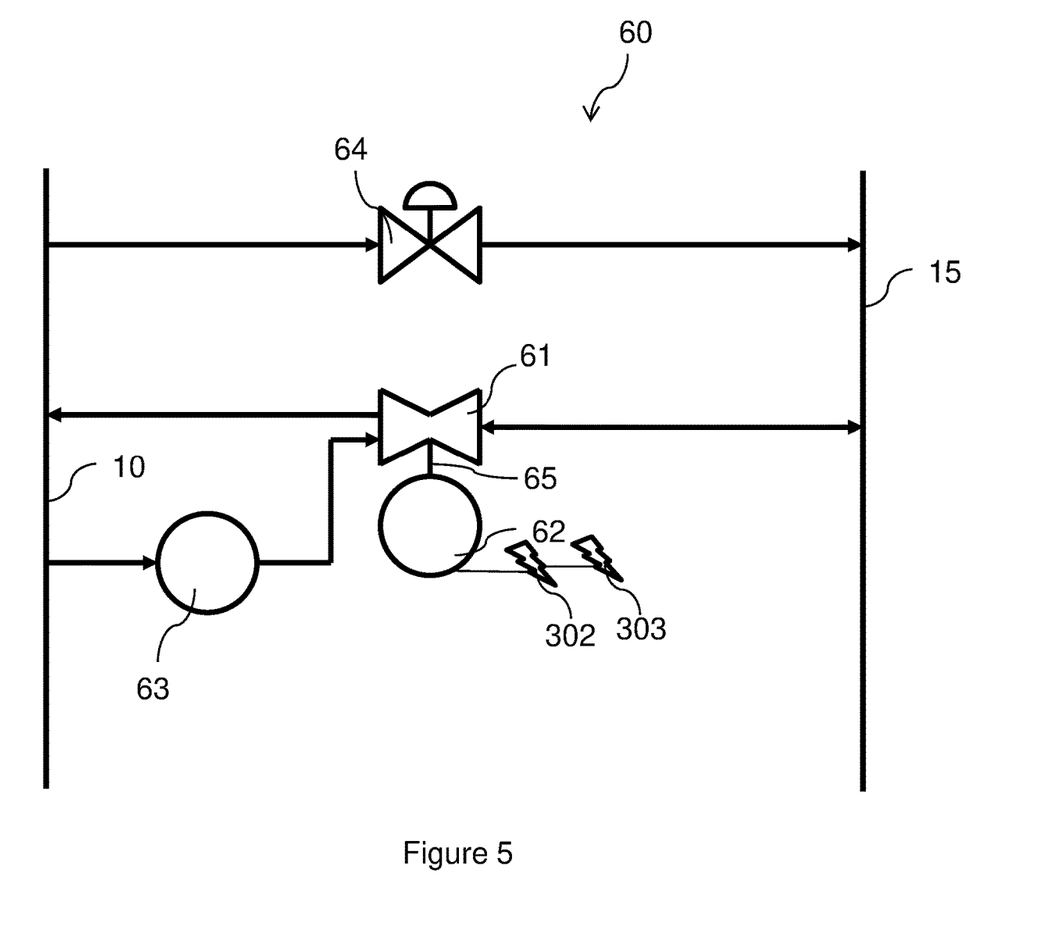
FIG. 5 represents, in the form of a block diagram, a third particular embodiment of a backfeeding installation that is the subject of the invention.

FIG. 5 shows a portion of a backfeeding installation 60 that is the subject of the invention, in the third configuration mentioned above. This backfeeding installation 60 comprises:
- an expander reversible into a compressor 61, which expander expands the gas from the transport network 10 and supplies the expanded gas to the distribution network 15. This gas expander is equipped with a mechanical drive which drives a reversible generator 62;
- a means 63 for heating the gas from the transport network 10, upstream from the gas expander 61;
- an expansion valve 64 linked to the transport 10 and distribution 15 networks.

When the reversible expander 61 acts as a compressor for compressing the gas from the distribution network 15 and injecting it into the transport network 10, it is driven by the reversible generator 62.

As is easily understood, when the transport network 10 supplies gas to the distribution network 15, the activation of the gas expander 61 results in electricity being generated by the generator 62. In contrast, when the gas expander is operating as a backfeeding compressor, electricity is consumed by the generator 62 thus acting as drive motor for the compressor.

In this third embodiment, the compressor and the gas expander are one and the same. As a result, the manufacturing cost of the backfeeding installation is reduced.

Preferably, in each of the embodiments shown, the compressor is a compressor with a piston and flap valves, in particular in the second and third configurations (FIGS. 4 and 5), in which the compressor is reversible into a drive expander for the generator. The types of compressor/expander that can be used to implement the invention also comprise, for example:
- centrifugal compressors;
- axial turbines;
- screw compressors; and
- vane compressors.

With regard to the reversibility of piston compression systems for energy production by expansion, the circulation of the gas is provided by flap valves, also called valves.

Figure 6A:
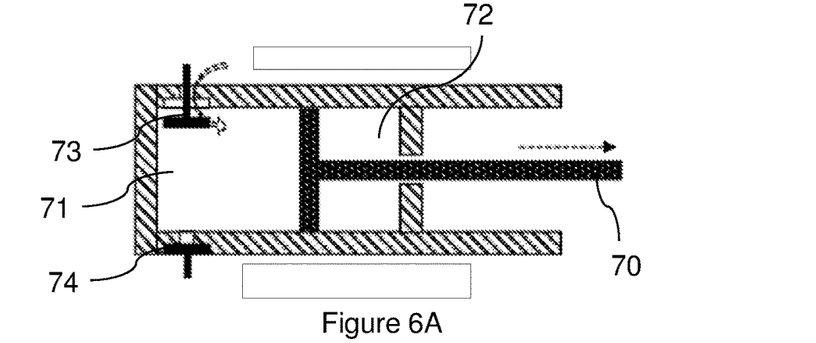
FIGS. 6A, 6B and 6C represent several operational phases of a reversible piston compressor.
Figure 6B:
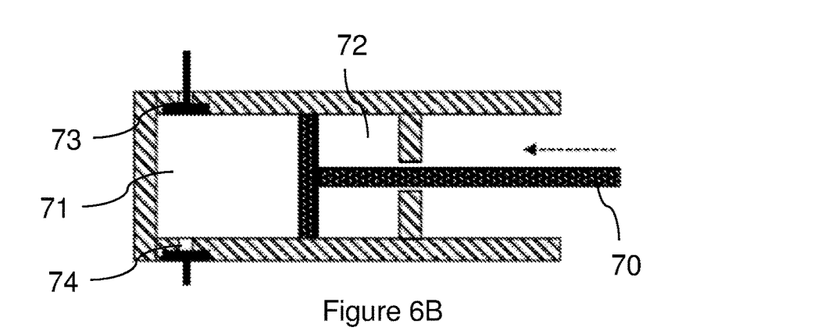
Figure 6C:
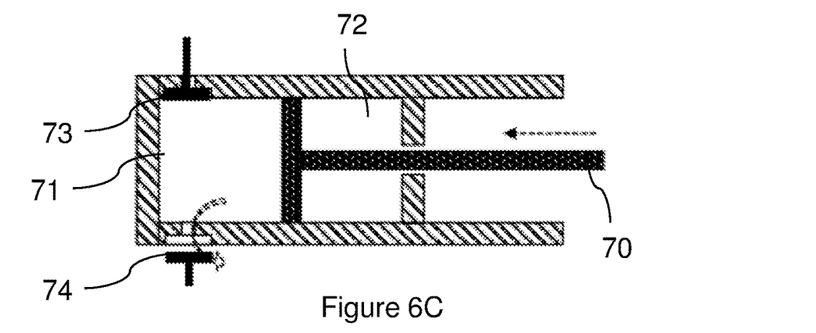

During compression, the flap valves let the gas pass freely during the suction and discharge phases according to their function, and are leak-tight during the compression phase. The movement of the flap valves is only due to the pressure difference between the compression chamber and the suction or discharge manifold. For some applications, for adjusting the capacity of the compressor, the suction flap valves can be kept open by a mechanical system for part of the compression phase. The main positions of the flap valves and piston are shown in FIGS. 6A to 6C. Each piston is driven by a motor. The transition from the rotational movement of the movement to the linear movement of each piston is carried out by a system of crankshaft then connecting rod then crosshead then piston rod.

Figure 7:
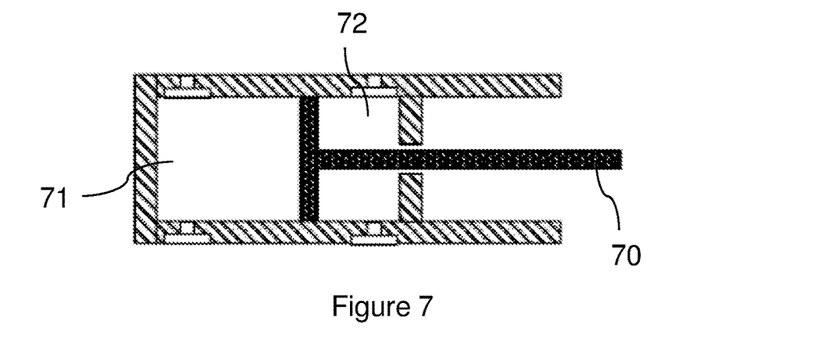
FIG. 7 represents the cylinder and piston assembly or a reversible piston compressor in the case of a double-acting piston.

Piston technologies are single-acting (pressure of a single face of the piston) or double-acting (pressure on both faces of the piston). FIG. 7 shows a double-acting piston.

In the context of this invention, the flap valve technologies currently utilized for the current techniques are called:
- "autonomous flap valve" when their movement is controlled naturally by pressures; and
- "semi-controlled flap valve" when a position is imposed for part of the compression cycle by a mechanical system.

The compressor is reversible, i.e. it allows gas to be expanded and a generator to be driven. In this operating configuration, the compressor is transformed into a motor, the energy thus coming from the pressure difference between the gas at the inlet (transport network pressure) and at the outlet (distribution network pressure). Preferably, the reversible compressor is coupled to a reversible electric motor, i.e. able to be used as a generator. Therefore, the system can be used as an electrical generator or as a compressor according to needs and the available pressures.

A new control mode is used to make the piston compressor reversible. It controls the position of the flap valve continuously by means of a mechanical system. This control mode is called a controlled flap valve. In the present description, "controlled flap valve" refers to a controlled or semi-controlled flap valve without distinction.

For reasons of clarity, the system transforming linear movement into rotational movement, and vice versa, is not described. A double-acting piston is described, equivalent to two single-acting piston in phase inversion. Note however that, in the present invention, the number of pistons and their phasing are in no way limited to a double-acting piston. The number of pistons, their geometric placement and their phasing are adapted in line with the performance levels required.

In each of FIGS. 6A to 8D, the low-pressure side (distribution network) is at the top of the figure and the high-pressure side (transport network) is at the bottom of figure. Each of FIGS. 6A to 7 shows a piston 70 moving between two chambers 71 and 72, and flap valves 73 to 78.

FIG. 6A shows a phase of filling the cylinder (chamber 71), in FIG. 6B, a phase of compression in the cylinder (chamber 71) and, in FIG. 6C, a phase of draining the cylinder (chamber 71) at high pressure.

FIG. 7 shows the cylinder and piston assembly 70 in the case of a double-acting piston 70. The cylinder (chamber 71) showing the greatest volume is called the "main cylinder" or "rear cylinder". The cylinder showing the smallest volume (chamber 72) is called the "secondary cylinder" or "front cylinder".

Figure 8A:
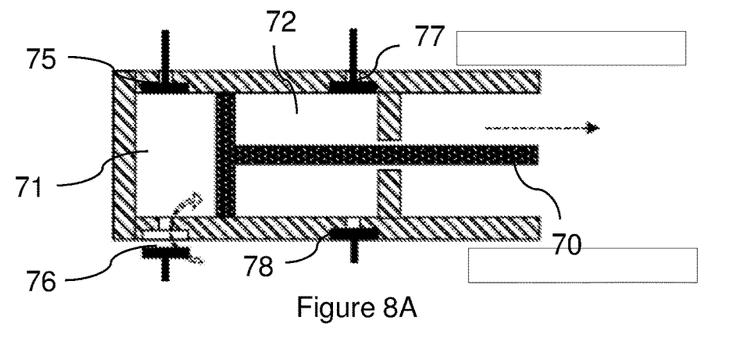
FIG. 8 represents the operating principle for the use of the reversible piston compressor in motor mode.
Figure 8B:
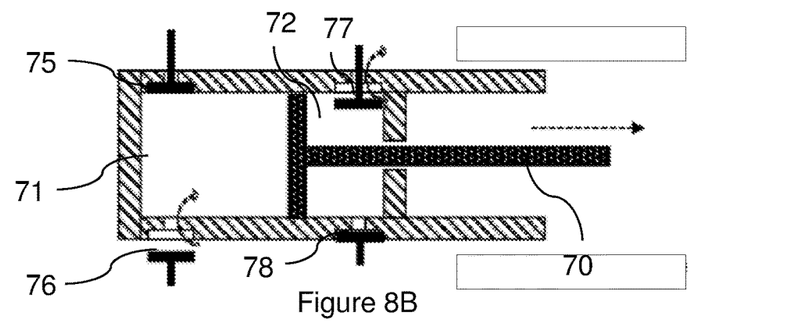
Figure 8C:
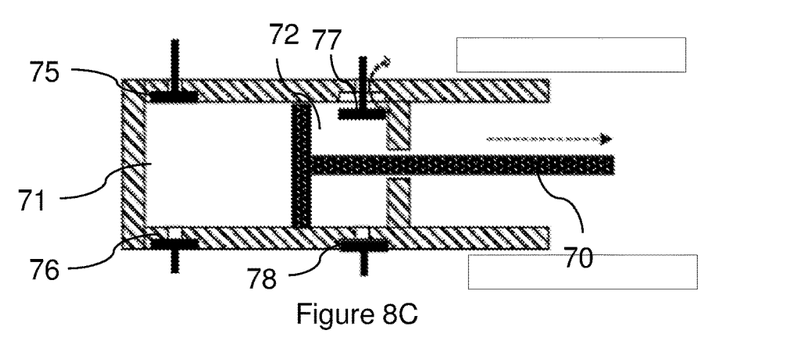
Figure 8D:
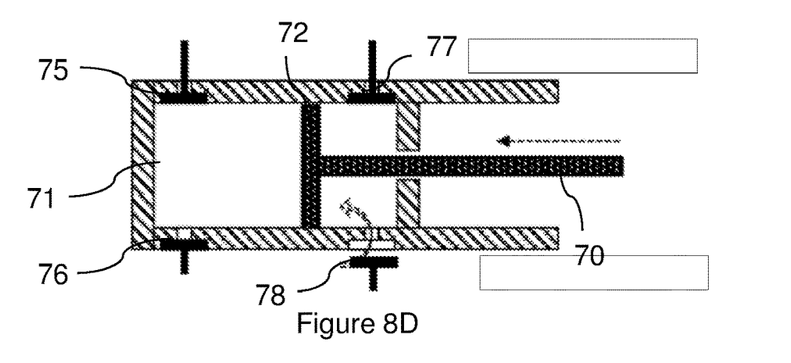

FIGS. 8A to 8D show the operating principle for the use of the reversible compressor in motor mode; In FIG. 8A, the main cylinder (chamber 71) starts its filling, the secondary cylinder (chamber 72) begins its pressure build-up. In FIG. 8B, the main cylinder continues its filling phase and the secondary cylinder is in expansion phase (low-pressure side draining). The choice of continuing to force the opening of the high-pressure side flap valve 77 is determined by the design of the flap valve 77 and the required performance of the system (compromise between expansion and power). In FIG. 8C, as the expansion flow rate is not maximized, the end of the linear movement of the piston 70 is achieved by the expansion of the gas in the main cylinder. In the context of the compromise between expansion and power, the low-pressure side flap valve 78 can be closed before the stroke end of the piston 70. FIG. 8D shows the start of the return stroke of the piston 70 via the secondary cylinder.

With regard to the reversibility of centrifugal compressors for energy production by expansion, the use of this centrifuge technology for energy production in an expansion process is referred to by the term "turbo-expander".

The turbo-expander is a centrifugal compressor in the compression direction and each system (reversible or not, but with its counterpart) is suitable for a compression or expansion ratio and flow rate flexibility. For very high compression ratios, a piston or screw type is used. The centrifugal compressor can also be used for very high compression ratios. A standard installation with a very high compression ratio for a gas with a very low initial pressure is a screw compressor followed by a centrifugal compressor.

Over the pressure ranges of the backfeeding unit, a piston compressor is suitable but other configurations are possible in the range of backfeeding units, for example two centrifugal compressors in series with intermediate cooling.

In the following description, the turbo-expanders and centrifugal compressors are split into five functions:
  inlet channel;
  inlet diffuser;
  centrifugal wheel;
  outlet diffuser; and
  outlet channel.

Figure 9:
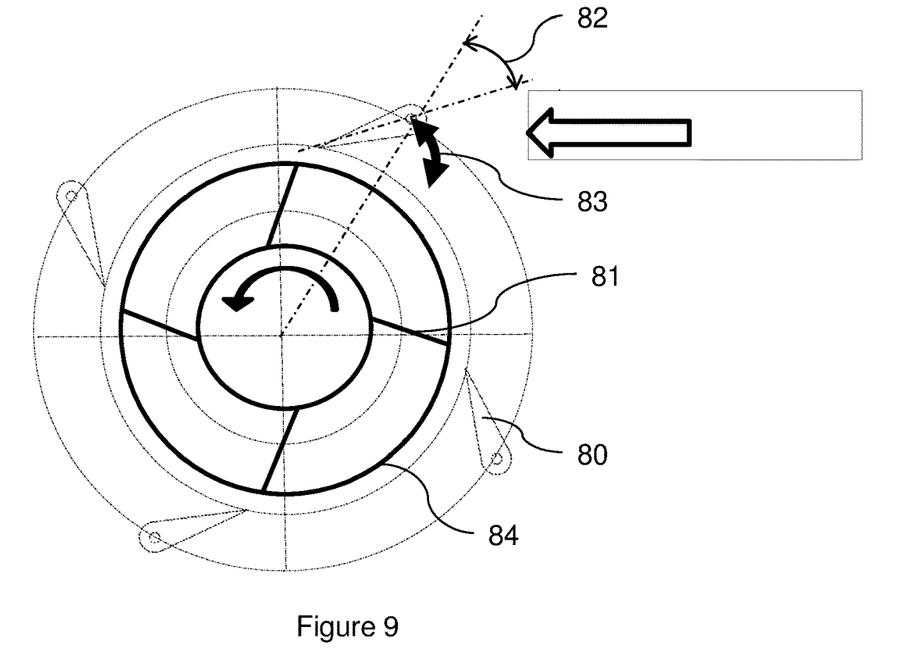
FIG. 9 represents the position of variable blades of a reversible centrifugal compressor in its gas expansion energy recovery function.
Figure 10:
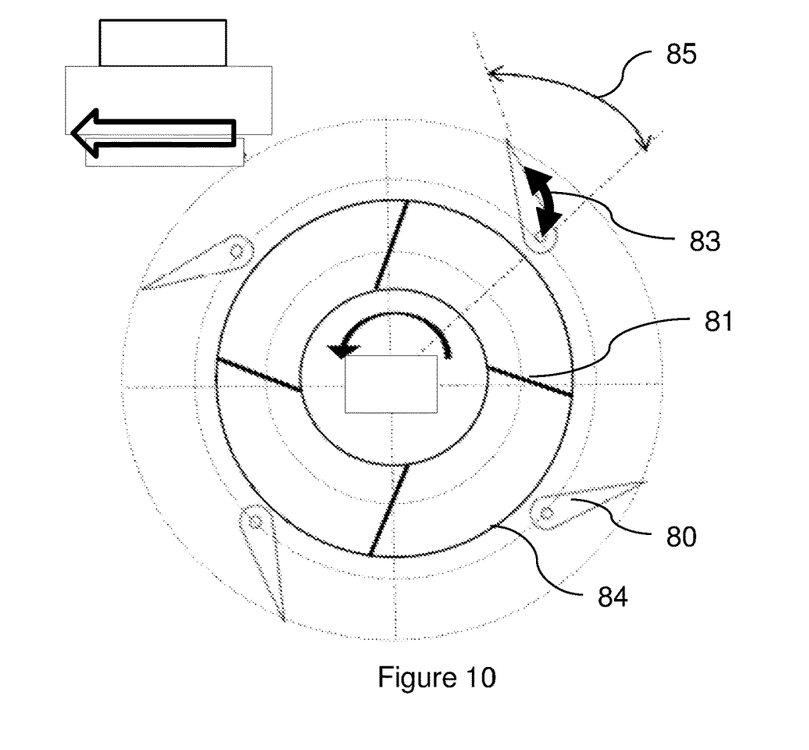
FIG. 10 represents the position of the variable blades of the compressor shown in FIG. 9, in its compression function.

In their utilization in the installation that is the subject of the invention, the functions of the inlet and outlet diffusers and the wheel are designed to be bi-directional. The reversibility of the expansion or compression phenomena is performed in the outlet diffuser in the compression function, which becomes an inlet diffuser in the expansion function. Reversibility is achieved by means of variable blades 80. The inlet diffuser in the compression function can be a variable blade design according to the performance levels required by either usage (compression or expansion). The inlet and outlet channels are of bidirectional design.

In FIGS. 9 and 10, the number of paddles 81 of the wheel 84 and variable blades 80 of the schematics is for information purposes. The angle of the blades 80 that is shown is adjustable as a function of the required performance levels (efficiency, ratios, flow rate). The angle is given by the thin arrow 82 shown in FIG. 9 and by the thin arrow 85 shown in FIG. 10.

FIG. 9 represents the position of the variable blades 80 in the turbo-expander function. The double arrow in bold 83 represents the modification to the axis of rotation of the blades 80. If only the angle of the blades 80 were modified, the system would be less efficient in its compression function because of the larger space between the blades 80 and the wheel 84. FIG. 10 represents the position of the variable blades 80 in the compression function.

With regard to the reversibility of screw or vane compressors for energy production by expansion, they can be a reversible design or keep a design favoring optimum efficiency in a preferred direction.

Note that, in each of the embodiments represented in the figures, the backfeeding installation also comprises a gas expander with no energy recovery in parallel with the gas expander driving the generator. However, this expander with no energy recovery, for example consisting of an expansion valve, is optional.

Other details for the utilization of the invention are given below.

The electricity generated can be used to make hydrogen (by electrolysis), or injected into the electricity grid, or sold to electricity consumers in the vicinity of the backfeeding installation.

The main types of reversible backfeeding units envisaged are:
  radial turbine with centrifugal compression;
  orbital compressors; and
  screw compressors.

The cold generated by the gas expansion can result in the generation of hydrate which can damage the turbine. The gas is therefore heated upstream from the expansion, and preferably a multi-stage expansion is chosen with heating at each stage.

In a similar way, in compression, preferably the compressed gas is cooled per stage.

Preferably, a shared reversible heat exchanger is utilized for heating and cooling.

The backfeeding units require motorization, electrical or other.

The introduction of a generator makes it possible to introduce energy optimization associated with the backfeeding unit, in particular by:
  pooling the power line (the backfeeding unit's incoming cable makes it possible to provide the expansion station with electricity if it not powered, and eliminates the need for an input line if the expansion station is equipped in this way);
  grouping infrastructures on a single site (access road, fencing, etc.);
  optimizing equipment;
  optimizing energy by generating electricity when there is high gas consumption, which generally corresponds to high electricity consumption and therefore high electricity costs. In addition, or as replacement for the electrical power line, an energy storage system, such as a battery or other, can be added to the system as the last adjustment of the system's energy optimization.

Solutions are described below, for application on the backfeeding installations, which make it possible to recover the expansion energy. Currently, the backfeeding units are only intended to operate for a few hours in summer each year. This therefore concerns a solution that allows income to be generated during the rest of the year by making use of some elements of the expansion station.

Three solutions are envisaged below:
  Carrying out the expansion through a turbine connected to an alternator to generate electricity in winter (preferred solution);
  Pooling the alternator by means of a shared gearbox between the expander and the compressor;
  Developing a reversible machine that will be used as a compressor in summer and an expander in winter.

The cost of the alternator/generator is low compared to the entire line comprising the compressor and/or the expander, and therefore the benefit of the second option appears limited. In addition, the cost of a shared gearbox that can be disengaged would increase the CAPEX and OPEX by over half. This restricts the choices for the architecture of the expander, obliging the designer to install a sealing gasket that will pollute the gas or generate an atmospheric leakage rate.

The efficiency of such a gearbox would be less than 90%, reducing the energy performance and making necessary the addition of an expensive high-capacity lubrication unit.

On the other hand, a machine that is reversible, compact and hermetic makes it possible to reduce the costs and complexity of the installation, while allowing income to be generated during the rest of the year.

There are other opportunities, in particular the compression of natural gas or industrial gas.

Heating the gas upstream from or during the expansion is essential.

There are two solutions for this.

- The installation of a cogeneration unit, referred to as CHP (for Cogeneration Heat and Power), consists of using the heat from the combustion of a gas motor to heat the gas of the expansion line. The motor is coupled to a generator, doubling the electricity generated.
- The installation of a heat pump, which makes it possible to transfer heat from a source at a certain temperature to a sink at a higher temperature.

The heat pump's consumption is directly proportional to the difference in temperature between this heat source and the heating plateau, whereby it is outside the scope of the conditions for the formation of hydrate gases. It is advantageous, if the environmental conditions allow it (high ambient temperature in winter or geothermal source).

The functional specifications of reversible backfeeding installations comprise:

- F1: Make possible the transmission of a finite volumetric flow rate of gas from the medium-pressure distribution network (GRDF) to the transport network at high pressure (GRTgaz) in off-peak periods;
- F2: Produce energy by means of the expansion of a finite volumetric flow rate outside off-peak periods to offset the backfeeding unit's consumption in off-peak periods;
- F3: Ensure an absence of pressure variation for the distribution network;
- F4: Comply with the conformity specifications of the GRTgaz and GRDF networks;
- F5: Comply with the quality specifications of the GRTgaz and GRDF networks.

The compression (F1) and expansion (F2) operations are not carried out simultaneously.

The temperature on output from the unit must not be lower than the recommendations applicable to the transport network.

Three solutions that make it possible to reduce costs by sharing certain elements between the expansion station equipped with a turbine and the backfeeding unit, are compared below.

To reduce costs, the system can be equipped with a reversible motor/alternator. The turbine and compressor are therefore mounted on a shared gearbox.

In winter, the alternator is a 4-pole synchronous generator that runs at the speed of the network (50 Hz, i.e. 1500 RPM). The turbine is axial or radial and runs at a speed of 3000 RPM. The compressor is uncoupled or vented. In summer, the motor is controlled by a frequency converter up to a predefined speed, for example 1000 RPM. No gear ratio is necessary in this configuration.

A first solution consists of equipping the gearbox with a single sliding gear, placed on a line limited to the alternator. This line will slidingly mesh with either the 3000 RPM line equipped with a smaller wheel (speed increase), or with the 1000 RPM line equipped with an equivalent size (gear ratio almost equal to 1). The line will be changed manually by a lever, at zero speed.

A second solution consists of having a shaft at the inlet, passing through with a direct outlet on the compressor line (1000 RPM) and an outlet on the turbine line (3000 RPM), both equipped at the end of the shaft with a coupling that can be disengaged.

To reduce costs further, the compression and expansion functions are shared by the same unit. Among the existing technologies, positive-displacement scroll compressors and centrifugal compressors are potentially reversible.

For example, a reversible radial turbine is utilized as a two-stage centrifugal compressor with two rotors mounted either side of a reversible 60,000 RPM high-speed alternator equipped with a frequency converter. The intermediate exchanger can be used independently to heat the gas before the second expansion stage or to cool it before it is recompressed. The very high rotational speed means that very high compression or expansion ratios can be achieved with a small rotor diameter.

With a centrifugal compressor, there is a limited operating range between the pumping curve and the choking flow rate. Pressure regulation by recycling is also preferred, to make the compressor operate at a specific working point.

Regulating the Expansion Station

In a first case, the total flow rate is split into a fixed flow rate that passes through the turbine and a variable flow rate that follows the downstream consumptions and passes by a pressure regulator. The turbine intake pressure is regulated by an intake valve. The turbine is preferably supplied only when the volumetric flow rate is sufficient and at constant speed. Alternatively, a pressure variation range on the distribution network is accepted. Considering that the pressure of the transport network is constant, the turbine is adjusted to the generating conditions.

An "ON/OFF" intake valve makes it possible to ensure that the turbine is not used outside its operating range. To improve suitability, it is recommended to use a variable-speed alternator and a variable stator in this configuration.

A centrifugal machine consists of a volute, a diffuser (or rectifier) and a rotor wheel. Centrifugal compressors transform rotational mechanical energy by increasing the pressure of the gas. Suction, compression and discharge are continuous flow processes.

The gaseous fluid is admitted into the axis of rotation, accelerated by centrifugation then "trapped" within volutes making it possible to transform the kinetic energy of the gas under pressure. Centrifugal compressors are distinguished from piston compressors, in particular, by their lower compression ratio and a more restrictive operating range.

Radial turbines operate in a completely opposite manner. The gas is admitted at high pressure at the edge and it is expanded as it goes towards the center of the rotation (shaft). Compared to an axial turbine, the fact that the gas flows from the outside towards the shaft reduces the stress and vibration level of the elements. The machine also absorbs the thermal stresses better.

Preferably, the expansion or compression can nevertheless be stepped by mounting two rotors on a single shaft.

Because of its compactness, a radial turbine can be mounted on the gearbox with pooling for the lubrication of the roller bearings and gearbox. In that case, a sealing gasket (oil or gas) isolates the network gas from the environment.

In some embodiments, two mechanical seals are mounted in tandem. A low-pressure intermediate chamber makes it possible to reduce the leakage of gas into the atmosphere by almost 90%.

In some embodiments, with a double seal and sealing fluid, the dynamic impermeability is ensured by a double seal in tandem with an intermediate labyrinth. A neutral sealing gas (nitrogen) is injected in overpressure into an intermediate chamber at a higher pressure than the working pressure.

The leakage of this sealing gas into the atmosphere poses no problems since there are already large amounts of it in the atmosphere. However, the compressed or expanded gas is polluted by the sealing gas, which is at overpressure.

This architecture is also encountered with oil seals.

The other large family of architecture is the hermetic machine. In this type of machine, the alternator (generally high-speed) is mounted directly on the shaft and submerged in the gas. It is cooled by an exterior circuit which is not in contact with the gas.

The absence of a gearbox enables better mechanical efficiency by reducing friction losses. In this configuration, the bearings or roller bearings are not lubricated:

The magnetic bearings withstand the axial loads very well and impose no constraints on the degree of reaction of the turbine. They are generally used for applications between 300 KW and 1 MW.

Below 300 KW, lubricated or dry roller bearings can be envisaged.

This configuration causes no pollution of the natural gas, no friction, and no emission to the outside. It also makes it possible to couple two expansion/compression stages on a single shaft with, in the middle, a high-speed alternator with variable speed, which makes possible a significant increase in compactness and almost non-existent mechanical friction losses.

Lastly, with stepped expansion/compression on the same machine, an external exchanger can be incorporated between the two stages to heat the gas during expansion or cool it during compression, in the same way as reciprocating piston compressor.

A variable stator makes it possible to modify the generating condition at the turbine inlet and therefore to:

Increase the flow rate range in which the machine can be used;

Smooth out the isentropic efficiency over the flow rate range.

Unlike a piston compressor, the operating range of a centrifugal compressor is constrained by its pumping line and its choking flow rate. Therefore, a constant flow rate solution will be favored for recycling.

Some rotary positive-displacement compressors can be used as expander. This is the case for screw compressors and orbital compressors.

The irreversibilities are significant in this type of machine, which reduces their performance. Most of them are induced in suction and discharge, during the phases of expansion by parietal friction and recirculation, and by internal leaks.

The rotor profile plays an important role in reducing leaks and friction losses. The first screw compressors had a symmetric profile, which created significant play when they were used as expanders. The development of new types of profiles led to the "N" profile, which has low play and reduced friction.

Orbital compressors are positive-displacement machines which have a volumetric ratio set by construction. The compressor includes a fixed spiral and a movable spiral. The pressure increases as the center of the spiral is approached. These types of expander can be divided into two categories based on how they handle friction:

Lubricated compressor. a compressor lubricated with oil, which reduces play and losses but requires a complex lubrication unit;

Non-lubricated compressor: the rotating portions are held tight against the fixed portions by means of a material with a very low friction coefficient (Teflon®)

The expansion (or compression) ratio of this type of machine is generally less than 10. For higher ratios, they need to be mounted in series. The volumetric expanders are very powerful at their design point, since they are highly dependent on the volumetric ratio obtained by construction.

Sometimes freezing of the regulation units of the expansion station is observed in winter. Without adding heat during expansion with energy recovery, this phenomenon will be greatly exacerbated. For a long time, it has been observed that the passage of the gas through the pressure regulator makes the temperature drop. With regard to flow, a regulator valve is a static obstacle that generates a pressure differential. This type of transformation is called isenthalpic expansion. The thermodynamic magnitude applied is the enthalpy by mass, which expresses the amount of energy contained in a kilogram of matter (as kJ·kg$^{-1}$).

Knowing the state on input and the pressure on output, the temperature on output is deduced. In the case where the kinetic energy of the gas is recovered by means of a turbine, this is known as isentropic expansion. The thermodynamic magnitude applied (at efficiency close to $\eta_{is}$) is thus the entropy by mass (expressed as kJ·kg$^{-1}$·K$^{-1}$).

The isentropic efficiency $\eta_{is}$ quantifies the irreversibilities linked to the transformation (viscous friction losses, internal leaks, parietal friction). It defines the efficiency of the machine in question. The energy extracted from the fluid in the form of work is directly proportional to the enthalpic drop ($\Delta h_{12}$) and mass flow rate ($\dot{m}$). The greater the efficiency, the greater the amount of work supplied to the shaft.

Hydrates are a non-stoichiometric class of compounds known as clathrates. They are formed when a host compound, water via its hydrogen bonds, forms a structure enclosing another compound, a methane molecule:

$$\text{Gaz Naturel} + \text{Eau (liquide)} \Longleftrightarrow \text{Hydrates (solide)}$$

Because of the pressure conditions and temperature drop during isentropic expansion, there is an increased risk of hydrate formation. However, the formation of solid compounds in the internal portions of a turbo-expander can lead to the flow being blocked, or equipment degradation. It is therefore essential to control the risk of these hydrates being formed during expansion.

Cogeneration consists of coupling the use of a combustion motor and an expansion turbine.

A generator coupled to the motor increases the production of electricity;

The thermal energy released by the combustion of the motor is used to preheat the gas.

This thermal energy is contained in the motor's cooling waters (lubrication oil, piston liners, cooling of the gas) and in the smoke released by the combustion.

A heat-transfer circuit collects this heat (from the motor's cooling waters and the exhaust smoke) to preheat the gas before expansion, and possibly reheat it in the case of a stepped expansion.

To model the performance of the cogeneration, one starts with the conditions of the site (temperature, pressure downstream and upstream) and the thermal power to be supplied to be outside the scope of the conditions for the formation of methane hydrate.

The overall performance of the cogeneration depends on:

The partial load of the motor;

The temperature on output of the smoke after the exchanger;

The smoke leaves the motor at a temperature close to 430° C. and atmospheric pressure. This is a significant portion of the thermal energy of the motor.

In estimating the composition of this smoke, the formation of water and carbon dioxide from the combustion reaction of the methane with the oxygen in the air can be concluded. The nitrogen in the air is not normally oxidized (in reality a tiny fraction reacts with the carbon to form NOx). A large portion of this smoke contains water vapor that must be condensed in order to recover the latent heat available.

Filters placed downstream reduce the quantity of $CO_2$ rejected to below the normative thresholds. If a greenhouse is in the vicinity, it is possible to regulate the motor to increase the level of $CO_2$ to be recovered. However, this is at the expense of the performance of the motor. The lower the temperature of the smoke on output, the better the overall efficiency of the cogeneration. It is therefore advantageous for the expansion to be stepped.

The heat pump makes it possible to extract the calories from one environment for transfer at a higher temperature to a second environment. The heat pump is based on the Rankine-Hirn cycle:

1-2: Isentropic compression
2-4: Isobar condensation
4-5: Isenthalpic expansion
5-1: Isobar evaporation The pressure levels are defined by the evaporation and condensation temperatures. In its mixed state (in the chamber) it is the vapor quality, not the temperature, that will vary when the system exchanges heat: the terms vaporization step (5-1) and condensation step (3-4) are used. Transformation 1-2 (isentropic compression) allows the temperature of the gas to be raised. The magnitudes evolve in the same way as isentropic expansion, except that the efficiency is the denominator. The enthalpy on output from the condenser is already known, since it involves the boiling point at the condensation temperature. Transformation 4-5 (isenthalpic expansion) allows it to be brought below the temperature of the surrounding environment. Note that in this case it is the enthalpy that is applied. The temperature of the vaporization step 5-1 essentially depends on the surrounding environment in question.

If the calories are extracted from a geothermal source, then the consumption is that of an extraction pump.

If one does not want the temperature of the gas at one point to drop below the threshold for the formation of methane hydrate, the expansion must be stepped. For this, the gas is preheated at the input to each expansion stage.

Irrespective of the environment in question, the use of a heat pump is essential for raising the temperature of the gas above the conditions for the formation of methane hydrate. The performance of this solution depends primarily on the heat source available nearby (ambient air, buried exchanger, geothermal energy).

In the interconnection stations we are interested in, the gas has to be expanded, i.e. its pressure is reduced, to pass from the transport network (high pressure) to the distribution network (low pressure). This expansion generates what is known as unavoidable energy. This unavoidable energy, lost, can be recovered, in particular to generate electricity by means of a turbine.

The expansion of the gas also leads to cold being generated. Consequently, the gas must be heated upstream, to recover the unavoidable energy without the gas lines freezing. In some embodiments of the backfeeding unit, the heating is provided using geothermal energy. More specifically: after it has been sent to the local urban heating network, the water of the geothermal circuit is recovered at about 30° C., a temperature sufficient for heating. This has the benefit of sending colder water back to the geothermal boreholes, resulting in reducing the use of the pump by encouraging the natural circulation.

The gas can also be heated by a local cogeneration plant, especially in winter. This cogeneration plant is a highly energy-efficient installation which, combined with the expansion turbine, doubles electrical production. The assembly therefore achieves efficiency levels of 80%: for 100 units of gas, the system makes it possible to produce 40 units of electricity with the turbine and 40 units of electricity with cogeneration. The backfeeding unit therefore makes it possible to produce mainly low-carbon electricity with an efficiency of 80%. This system becomes a peak-load plant for the network, replacing a fossil fuel power plant that emits significantly more $CO_2$.

The sharp drop in the temperature of the downstream gaseous flow upon expansion, harmful for the integrity of the network, means that the gaseous flow must be heated by an external supply of calories. The source used most frequently is a boiler upstream from the expansion valve: a twofold loss, since the expansion energy is not recovered and gas is consumed. Therefore, preferably, a local source of natural heat, which would otherwise remain unused, is utilized and a cogeneration installation is associated with it. In this way, the synergies between the three networks—heat, gas and electricity—are exploited.

The pressure drop results in a significant cooling of the gas, two times more pronounced with the turbine than with the valves. This could make its temperature fall to −30° C.

A cogeneration unit is used to heat the gas upstream from the expansion. Obtained from the combustion of gas, the electricity is injected into the electricity grid, while the heat is used to heat the gas upstream from the turbine.

In summer, a heat network, e.g. geothermal, is used, thus switching to 100% renewable energy. In some embodiments, the water exits the boreholes at 70° C., then passes through the buildings before returning to the boreholes at a temperature of 35° C.: it is this residual heat that is used, which will further increase the efficiency of the heat network.

Note that the cold generated by the decompression of the gas can be used, either for cooling data centers or for air conditioning.

The invention claimed is:

1. Energy-optimized backfeeding installation comprising:
    at least one compressor between a gas network at a first pressure and a gas network at a second pressure higher than the first pressure, said compressor being driven by an electric motor;
    an automaton for controlling the operation of each compressor,
    at least one sensor for checking the quality compliance of the gas circulating in the compressor;
    at least one meter for metering a flow rate of gas circulating in the compressor;
    at least one filter for filtering the gas circulating in the compressor; and
    a gas expander for expanding gas initially at the second pressure in order to supply the gas network at the first pressure;
characterized in that it also comprises:
    a generator driven by the gas expander.

2. Backfeeding installation according to claim 1, wherein the compressor and the gas expander are one and the same.

3. Backfeeding installation according to claim 1, wherein the generator is formed by the electric motor of at least one compressor.

4. Backfeeding installation according to claim 1, which comprises a clutch between the gas expander and the generator.

5. Backfeeding installation according to claim 1, which comprises a clutch between the between the compressor motor and the compressor.

6. Backfeeding installation according to claim 1, which also comprises a gas expander with no energy recovery in parallel with the gas expander driving the generator.

7. Backfeeding installation according to claim 1, wherein the compressor is a centrifugal compressor with variable blades.

8. Backfeeding installation according to claim 1, which comprises a shared reversible heat exchanger for heating the gas to be expanded and cooling the gas to be compressed.

9. Backfeeding installation according to claim 1, which comprises, during the operation of the expander, cold and electrical power cogeneration.

10. Backfeeding installation according to claim 1, which comprises, during the operation of the compressor, heat generation.

11. Backfeeding installation according to claim 1, which is associated with a heat and electrical power cogeneration unit, the heat being used to heat the gas during expansion, an electricity outlet of the generator being linked to an electricity outlet of the cogeneration unit.

12. Backfeeding installation according to claim 11, wherein the cogeneration unit comprises a second motor coupled to a generator, the heat generated by the motor heating the gas during expansion.

13. Backfeeding installation according to claim 11, wherein the thermal energy from the second motor is contained in the motor's cooling waters and in the smoke released by the combustion, a heat-transfer circuit collecting at least a portion of this thermal energy to preheat the gas before expansion.

14. Backfeeding installation according to claim 11, wherein the cogeneration unit comprises a geothermal source whose residual heat, after heating buildings or equipment, reheats the gas during expansion.

15. Backfeeding installation according to claim 1, wherein the generator is a reversible radial turbine as a two-stage centrifugal compressor with two rotors mounted either side of an alternator.

16. Backfeeding installation according to claim 15, wherein the alternator is variable-speed and comprises a variable stator.

17. Backfeeding installation according to claim 15, wherein the expansion or compression are stepped by mounting two rotors on a single shaft.

18. Backfeeding installation according to claim 1, wherein the generator comprises a radial turbine mounted on a gearbox with pooling for the lubrication of the roller bearings and gearbox.

* * * * *